United States Patent [19]

Watanabe et al.

[11] Patent Number: 5,109,086
[45] Date of Patent: Apr. 28, 1992

[54] PROCESS FOR PRODUCING A VINYLIDENE FLUORIDE COPOLYMER

[75] Inventors: Junichi Watanabe, Ageo; Makoto Fujiwara, Kamisu, both of Japan

[73] Assignee: Shin-Etsu Chemical Co., Ltd., Tokyo, Japan

[21] Appl. No.: 493,244

[22] Filed: Mar. 14, 1990

[30] Foreign Application Priority Data

Mar. 15, 1989 [JP] Japan .................. 1-62852

[51] Int. Cl.$^5$ .............................. C08F 14/22
[52] U.S. Cl. .................. 526/249; 526/253; 526/254; 526/255
[58] Field of Search ............ 526/254, 249, 253, 255

[56] References Cited

U.S. PATENT DOCUMENTS

| | | | |
|---|---|---|---|
| 2,918,501 | 12/1959 | Brehm et al. | 526/254 |
| 3,056,767 | 10/1962 | Pailthorp et al. | 526/254 |
| 3,080,347 | 3/1963 | Sandberg et al. | 526/254 |
| 3,655,727 | 1/1970 | Patel et al. | 526/254 |
| 4,675,380 | 6/1987 | Buckmaster et al. | 526/254 |
| 4,677,175 | 6/1987 | Ihara et al. | 526/254 |

FOREIGN PATENT DOCUMENTS

| | | | |
|---|---|---|---|
| 0186180 | 7/1986 | European Pat. Off. | 526/254 |
| 1495205 | 3/1969 | Fed. Rep. of Germany | 526/254 |
| 856469 | 12/1960 | United Kingdom | 526/254 |
| 894649 | 4/1962 | United Kingdom | 526/254 |
| 954830 | 4/1964 | United Kingdom | |
| 1298170 | 11/1972 | United Kingdom | |
| 2084593 | 4/1982 | United Kingdom | |

Primary Examiner—Joseph L. Schofer
Assistant Examiner—N. Sarofim
Attorney, Agent, or Firm—Oblon, Spivak, McClelland, Maier & Neustadt

[57] ABSTRACT

A process for producing a vinylidene fluoride copolymer, comprising the step of copolymerizing a mixture of monomers containing a polymerizable double bond comprising:
(A) vinylidene fluoride, and
(B) a fluorine compound represented by the formula:

$$CH_2=CH-R_f \qquad (I)$$

wherein $R_f$ is a perfluoroalkyl group having 1 to 12 carbon atoms, with the content of (B) being 0.1 to 50% by weight, in the presence of a radical polymerization initiator. A vinylidene fluoride copolymer having excellent flexibility, impact resistance and cold resistance together with the good characteristics inherently possessed by polyvinylidene fluoride can be obtained.

6 Claims, No Drawings

PROCESS FOR PRODUCING A VINYLIDENE FLUORIDE COPOLYMER

BACKGROUND OF THE INVENTION

1. Field of the Invention

This invention relates to a process for producing a vinylidene fluoride copolymer, particularly to a process for producing a vinylidene fluoride copolymer having excellent flexibility, impact resistance and cold resistance.

2. Description of Prior Art

Polyvinylidene fluoride has excellent weathering resistance, corrosion resistance, electrical characteristics, processability, etc., and therefore has been used in a diversity of uses.

However, since polyvinylidene fluoride has great crystallinity, residual stress during processing is great, susceptible to formation of stress cracks with lapse of time, also lacks flexibility, with impact resistance and cold resistance being also inferior as compared with other fluorine resins. Accordingly, for improving flexibility, impact resistance and cold resistance, there have been proposed, for example, the method in which vinylidene fluoride is copolymerized with another monomer, such as hexafluoropropylene, tetrafluoroethylne, methyl methacrylate, butyl acrylate, etc., or the method in which an acrylic resin, etc. is formulated in polyvinylidene fluoride.

However, the copolymer obtained by the method of the prior art of copolymerizing vinylidene fluoride with another monomer has excellent flexibility, but has such problems that the melting point is lowered to lower the usable temperature region, or that processability is lowered. On the other hand, the composition obtained by the method of formulating an acrylic resin, etc. in polyvinylidene fluoride has excellent transparency, processability and flexibility, but has such problems that weathering resistance and chemical resistance are worsened.

SUMMARY OF THE INVENTION

Accordingly, an object of the present invention is to provide a process for producing a vinylidene fluoride copolymer having the good characteristics inherently possessed by polyvinylidene fluoride as well as excellent flexibility, impact resistance and cold resistance.

The present invention, in order to solve the above-mentioned problems, provides a process for producing vinylidene fluoride copolymer, comprising the step of copolymerizing a mixture of monomers containing polymerizable double bonds comprising:
(A) vinylidene fluoride, and
(B) a fluorine compound represented by the formula:

$$CH_2=CH-R_f \qquad (I)$$

wherein $R_f$ is a perfluoroalkyl group having 1 to 12 carbon atoms,
with the content of (B) being 0.1 to 50% by weight, in the presence of a radical polymerization initiator.

According to the process for preparing a vinylidene fluoride copolymer of the present invention, a vinylidene fluoride copolymer having excellent flexibility, impact resistance and cold resistance together with the good characteristics inherently possessed by polyvinylidene fluoride can be obtained.

DETAILED DESCRIPTION OF PREFERRED EMBODIMENTS

In the above formula (I) representing the fluorine compound which is the component (B) of the monomeric mixture to be used in the present invention, $R_f$ is a perfluoroalkyl group having 1 to 12 carbon atoms, including, for example, perfluoromethyl, perfluoroethyl, perfluoropropyl, perfluorobutyl, perfluoropentyl, perfluorohexyl, perfluoroheptyl, perfluorooctyl, perfluorododecyl groups and the like. Specific examples of the fluorine compound of the component (B) may include perfluoromethylethylene (i.e., 3,3,3-trifluoropropylene), perfluorobutylethylene, perfluorohexylethylene, perfluorooctylethylene, perfluorododecylethylene and the like. These may be used either singly or in combination of two or more.

The mixture of monomers containing polymerizable double bonds to be used in the process of the present invention may also contain, in addition to vinylidene fluoride of (A) and the fluorine compound of (B) as mentioned above, other monomers having a polymerizable double bond copolymerizable with vinylidene fluoride or the fluorine compound of (B). Examples of such other monomers may include fluorine-containing monomers such as tetrafluoroethylene, hexafluoropropylene, chlorotrifluoroethylene and the like; and ethylene, methyl methacrylate, etc. These may be used either singly or in combination of two or more.

The monomeric mixture to be used in the present invention contains 0.1 to 50% by weight, preferably 0.5 to 30% by weight, of the fluorine compound of the component (B). If the content of the component (B) in the monomeric mixture is less than 0.1% by weight, no improvement can be brought about in flexibility, impact resistance or cold resistance of the copolymer obtained, while if it exceeds 50% by weight, the excellent specific features in weathering resistance, corrosion resistance, electrical characteristics, etc. inherently possessed by polyvinylidene fluoride will by impaired.

The content of vinylidene fluoride in the monomeric mixture may be generally 50% by weight or more, preferably 70% by weight or more.

As the radical polymerization initiator to be used, any of those conventionally used for polymerization of vinylidene fluoride may be available. For example, there may be included organic or inorganic peroxides such as di-n-propylperoxydicarbonate, diisopropylperoxydicarbonate, heptafluorobutyl peroxide, t-butylperoxyisobutyrate, isobutyryl peroxide, ammonium persulfate, potassium persulfate, etc.; azo compounds such as $\alpha,\alpha'$-azobis ($\alpha$, $\gamma'$-demethylvaleroamidine) hydrochloride, etc.; redox polymerization initiators and so on. These may be used either singly or in combination of two or more.

The system of copolymerization is not particularly limited, but any system of suspension polymerization, emulsion polymerization, solution polymerization, mass polymerization, etc. can be used. For example, when copolymerization is effected by suspension polymerization, it may be carried out according to the method in general practiced in the case of suspension polymerization in the presence of a radical polymerization initiator. The suspending agent to be used in this case includes, for example, water-soluble polymeric compounds such as methyl cellulose and polyvinyl alcohol. For controlling the molecular weight of the copolymer obtained, a chain transfer agent such as isopropyl alcohol, acetone, t-butyl alcohol, isopentane, etc., or a pH buffer such as disodium phosphate etc.; or a pH controller such as caustic soda, etc. may be optionally used, if desired. Further, when the copolymer of the present invention is produced by suspension polymerization or emulsion polymerization, water is generally used as the polymerization medium, but also a hydrophobic halogenated hydrocarbon solvent such as trichlorotrifluoroethane, etc. may be optionally used in combination with water.

Copolymerization may be carried out generally under the conditions of a polymerization temperature ranging from 1° C. to 100° C., and a polymerization time ranging from 1 to 50 hours.

In the process of the present invention, the respective components may be charged into a polymerization vessel by charging initially all the amounts of the components (A) and (B), or alternatively by charging a part or all of either one or both of the components (A) and (B) initially and charging the rest during polymerization continuously or intermittently.

EXAMPLES

In the following, the process of the present invention is described in detail by referring to Examples and Comparative examples.

EXAMPLE 1

Into a stainless steel reactor of one-liter inner volume were charged 500 ml of deionized water, 0.1 g of methyl cellulose, 0.5 g of isopropylperoxydicarbonate and 100 g of trichlorotrifluoroethane, and the reactor after replaced internally with nitrogen was evacuated to vacuum. Next, 5 g of perfluorobutylethylene was charged, and then 95 g of vinylidene fluoride was charged, followed by stirring at a rotational number of 1,000 r.p.m. of the stirring blades. After 15 minutes, polymerization was initiated by heating to 50° C. The inner pressure inside the reactor initially indicated 30 atm. Thirty hours after initiation of polymerization, when the inner pressure was lowered to 15 atm., the unreacted monomers were purged, and the reaction mixture was taken out of the reactor, cooled, dehydrated and dried to give 70 g of a copolymer as white powder.

The copolymer obtained was molded by hot press into a plate with a thickness of 1 mm, and torsional rigidity at 30° C. was measured according to JIS K6745, Izod impact strength according to ASTM D256, and embrittlement temperature according to JIS K7216. The results are shown in Table 1.

EXAMPLES 2–4

In each Example, except for using the fluorine compounds shown in Table 1 in place of perfluorobutylethylene, copolymers were obtained in the same manner as in Example 1. The torsional rigidity, Izod impact strength and embrittlement temperature of each copolymer obtained were measured. The results are shown in Table 1.

COMPARATIVE EXAMPLE 1

For the polyvinylidene fluoride manufactured by Solvay (Solef 1008), torsional rigidity, Izod impact strength and embrittlement temperature were measured in the same manner as in Example 1. The results are shown in Table 1.

TABLE 1

|  | Fluorine compound | Torsional rigidity ($\times 10^3$ kg/cm$^2$) | Izod Impact strength (kg · cm/cm$^2$) | Embrittlement temperature (°C.) |
| --- | --- | --- | --- | --- |
| Example |  |  |  |  |
| 1 | Perfluorobutyl-ethylene | 3.6 | 45 | −30 |
| 2 | Perfluoromethyl-ethylene | 4.0 | 38 | −28 |
| 3 | Perfluorohexyl-ethylene | 3.1 | not broken | −32 |
| 4 | Perfluorooctyl-ethylene | 2.5 | not broken | −33 |
| Comparative example 1 | — | 7.0 | 12 | −18 |

EXAMPLE 5

Into a stainless steel reactor of two-liter inner volume were charged one liter of deionized water, 0.2 g of methyl cellulose, 2.0 g of n-propylperoxydicarbonate, 200 g of trichlorotrifluoroethane and 0.4 g of disodium phosphate (decahydrate), and the reactor after replaced internally with nitrogen was evacuated to vacuum. Next, 2 g of perfluoromethylethylene (i.e., trifluoropropylene) was charged, and then 198 g of vinylidene fluoride was charged, followed by stirring at a rotational number of 600 r.p.m. of the stirring blades. After 15 minutes, polymerization was initiated by heating to 45° C. The inner pressure of the reactor initially indicated 30 atm. Twenty-five hours after initiation of polymerization, when the inner pressure was lowered to 10 atm., the unreacted monomers were purged, and the reaction mixture was taken out of the reactor, cooled, dehydrated and dried to give 150 g of a copolymer as white powder.

The copolymer obtained was molded into a plate for measurement of torsional rigidity, Izod impact strength, and embrittlement temperature similarly as described in Example 1. The results are shown in Table 2.

EXAMPLE 6

Except for changing the amounts of perfluoromethylethylene and vinylidene fluoride used to those shown in Table 2, copolymers were obtained in the same manner as in Example 5, and the copolymers obtained were subjected to measurement of torsional rigidity, Izod impact strength and embrittlement temperature in the same manner as in Example 1. The results are shown in Table 2.

TABLE 2

|  | Example 5 | Example 6 |
| --- | --- | --- |
| Perfluoromethyl-ethylene (g) | 2 | 20 |
| Vinylidene fluoride (g) | 198 | 180 |
| Torsional rigidity | 5.5 | 2.9 |

TABLE 2-continued

|  | Example 5 | Example 6 |
| --- | --- | --- |
| ($\times 10^3$ kg/cm$^2$) Izod impact strength (kg · cm/cm$^2$) | 21 | not broken |
| Embrittlement temperature | $-21$ | $-40$ or lower |

We claim:

1. A process for producing a vinylidene fluoride copolymer, comprising the step of copolymerizing a mixture of monomers containing a polymerizable double bond consisting of
   (A) vinylidene fluoride, and
   (B) a fluorine compound represented by the formula:

$$CH_2=CH-R_f \qquad (I)$$

wherein $R_f$ is a perfluoroalkyl group having 1 to 12 carbon atoms,
with the content of (B) being 0.1 to 50% by weight, in the presence of a radical polymerization initiator.

2. The process according to claim 1, wherein the fluorine compound of the component (B) is selected from the group consisting of perfluoromethylethylene, perfluorobutylethylene, perfluorohexylethylene, perfluorooctylethylene, and perfluorododecylethylene.

3. The process according to claim 1, wherein said mixture of monomers contains the vinylidene fluoride of the component (A) in an amount of at least 50% by weight.

4. The process according to claim 1, wherein said mixture of monomers contains the fluorine compound of the component (B) in an amount of from 0.5 to 30% by weight.

5. The process according claim 1, wherein said radical polymerization initiator is a peroxide, an azo compound or a redox initiator.

6. A process for producing a vinylidene fluoride copolymer, comprising the steps of copolymerizing a mixture of monomers containing a polymerizable double bond consisting of:
   (A) vinylidene fluoride,
   (B) a fluorine compound represented be the formula:

$$CH_2=CH-R_f$$

wherein $R_f$ is a perfluoroalkyl group having 1 to 12 carbon atoms, and
   (C) tetrafluoroethylene, hexafluoropropylene, chlorotrifluoroethylene, ethylene or methyl methacrylate,
with the content of (B) being 0.1 to 50% by weight, in the presence of a radical polymerization initiator.

* * * * *